No. 751,648. Patented February 9, 1904.

UNITED STATES PATENT OFFICE.

NOAK VICTOR HYBINETTE, OF PLAINFIELD, NEW JERSEY.

PROCESS OF TREATING COPPER ORES.

SPECIFICATION forming part of Letters Patent No. 751,648, dated February 9, 1904.

Application filed April 23, 1903. Serial No. 154,035. (No specimens.)

*To all whom it may concern:*

Be it known that I, NOAK VICTOR HYBINETTE, of Plainfield, Union county, State of New Jersey, have invented a new and useful Process of Treating Copper Ores, of which the following is a full, clear, and exact description.

There are many deposits of copper ores of too low grade and too silicious to be smelted without concentration, and if concentrated by the ordinary methods they leave a large part of their value in the tailings. Such ores cannot be worked profitably by methods heretofore used, and although they are generally well adapted for wet processes the expense of freighting to the mines the salt, acid, and metallic iron needed in such treatment is prohibitory. I have invented a process by which these ores can be cheaply worked and will now describe it, premising that the details of the operation can be modified in various ways within the scope of my claims.

I have discovered that if the ore is mixed with certain fusible salts soluble in water, such as sulfate of sodium, and subjected to an oxidizing roast, followed by a reducing roast, the copper is converted thereby into insoluble compounds in an extremely fine state of division, so that after the salts have been dissolved out the fine particles of ore can be washed out from the silicious gangue and then separated by screening and brought thereby to a high state of concentration suitable for immediate smelting.

I proceed as follows: The sulfid ore to be treated is ground coarsely, so as preferably to pass a six-to-eight-mesh screen, and the mill in which the grinding is done should be of such construction as to produce as small as possible amount of fines. I then mix the ground ore with a small percentage, preferably about five per cent., of sulfate of sodium and subject the mixture to an oxidizing roast, preferably at a low red heat. The ordinary calcining-furnaces used in metallurgical establishments are well suited for the purpose. After the ore has thus been roasted a reducing agent—such as sawdust, charcoal, soft coal, &c.—is mixed with it and the roasting is continued, the reducing action of the carbon having the effect of decomposing the soluble metallic compounds which may have been formed during the first roasting and rendering them insoluble in water. Care should be taken to stop this reducing roasting soon after the desired condition of insolubility is reached. The material is now drawn from the furnace, care being taken to cool it out of contact with the atmosphere, so that the metallic compounds may not be reoxidized, and thus made soluble. The ore so treated is then mixed with water to dissolve out the sodium sulfate and wash out the metallic particles from their rocky matrix, the action of the water being aided by subjecting the material to a gentle rubbing. These steps of the process may be conveniently carried out by charging the mixture with water into a revolving barrel or a mill, such as is used for mixing mortar. The material delivered from such mill, consisting of the mingled but separated particles of ore and rock, is passed with a current of water over a fine screen—say, from one hundred to two hundred mesh—or, preferably, is passed over successive screens of increasing fineness, the last being of from one hundred to two hundred mesh. This water passing through the screen carries with it the fine particles of ore which settle very quickly in the form of a slime and are collected by ordinary means. The slime thus produced assays from five to ten times as much metallic copper as in the ore originally treated and is well suited for the well-known processes of refining.

The reactions that probably take place in this process are as follows: The sulfid of copper is largely oxidized by the oxidizing roasting to copper sulfite and sulfate. Sulfate of sodium unites readily with these oxidized compounds, forming easily-fusible double salts, the copper compound in the smallest crevices of the particles of rock seeming thus to be converted. When the reduction takes place in the second roasting, the copper compounds are thrown out of their combination with the sulfate of sodium and exist as insoluble compounds in an extremely-fine state of division all through the mass. When the salt is dissolved and the material rubbed, as above stated, the particles of copper compounds are set free from their mechanical adhesion to the rock and being extremely minute will pass through a screen so fine that only a small portion of the rock will go with them. A small portion of the copper-bearing mineral will naturally escape the oxidizing influence of the roasting and remain as sulfid. Another small part is converted into oxid of copper. These portions are not acted upon by sodium sulfate; but it appears that the easily-fused double salt of copper and sodium is so thoroughly absorbed in the mineral that when the salt has been leached out and the material washed and rubbed with water practically the whole of the metallic constituent of the ore is freed from the rock as an impalpable powder, which with the water forms a heavy slime.

The uses of the process will be evident from this explanation of its workings. Ores in which the gangue is easily broken up into an impalpable powder, particularly after roasting, are not suitable; but ores composed of quartz with finely-divided particles of sulfid minerals are the most suitable.

My invention is applicable with great advantage to the tailings heretofore produced in processes of water concentration, which contain often as much as two and one-half per cent. of copper and can be concentrated by my process to a material of high grade.

Sulfate of sodium is the best salt to use; but it can be substituted by other fusible and soluble salts, particularly alkali salts, which if roasted with a sulfid ore will combine therewith as a sulfate.

It is evident that the salt used can be collected from the water and used over and over again and that other processes than screening—for example, separation by jigging—can be used for separation of the very heavy fine slimes of copper compounds from the rock.

Within the scope of my invention as broadly claimed it is possible to obtain useful results by performing the first or oxidizing roasting of the ore without admixture of a salt, although the concentration obtained thereby will not be of such high degree and is imperfect. In such case the oxidizing roast converts the copper compounds into a somewhat-soluble condition, and by the second roasting with carbon or other reducing agent they are reduced to an insoluble condition, the effect of the treatment being to disintegrate the particles of metallic compounds without disintegrating the rock, and thus to loosen the particles of metallic compounds, which when subjected to the water treatment are washed out from the crevices of the pieces of rock and from adhesion to their surface and are brought into a state of very fine subdivision. They can then be screened readily as a heavy slime from the rock particles which, being practically unaffected by my process, remain in coarse condition.

I claim—

1. The method hereinbefore described of treating ores of copper and similar metals, which consists in subjecting the ore in a state of coarse division to an oxidizing roasting and converting the metallic compounds thereby into a more or less soluble condition, then roasting it with a reducing agent, thus rendering said compound insoluble, treating the mixture with water and separating the finely-divided valuable material from the coarser gangue; substantially as described.

2. The method hereinbefore described of treating ores of copper and similar metals, which consists in subjecting the ore in a state of coarse division to an oxidizing roasting and converting the metallic compounds thereby into a more or less soluble condition, then roasting it with a reducing agent, thus rendering said compound insoluble, treating the mixture with water and rubbing and separating the finely-divided valuable material from the coarser gangue; substantially as described.

3. The method hereinbefore described of treating ores of copper and similar metals, which consists in subjecting the ore in a state of coarse division to an oxidizing roasting and converting the metallic compounds thereby into a more or less soluble condition, then roasting it with a reducing agent, thus rendering said compound insoluble, treating the mixture with water and screening the finely-divided valuable material from the coarser gangue; substantially as described.

4. The method hereinbefore described of treating ores of copper and similar metals, which consists in subjecting the ore to an oxidizing roasting with a salt of an alkaline metal, then roasting it with a reducing agent, and then separating the valuable material mechanically from the coarser gangue; substantially as described.

5. The method hereinbefore described of treating ores of copper and similar metals which consists in subjecting the ore in a state of coarse division to an oxidizing roasting with sodium sulfate, then roasting it with a reducing agent, treating the mixture with water, and separating the finely-divided valuable material from the coarser gangue; substantially as described.

6. The method herein described of treating ores of copper and similar metals, which consists in loosening the copper compound by converting it partly at least into the condition of a salt soluble in water, then converting it into an insoluble compound, treating the mixture with water, and separating the finely-divided valuable material from the coarser gangue; substantially as described.

7. The method herein described of treating ores of copper and similar metals, which consists in converting the copper constituent of the ore partly at least into the condition of a soluble double salt of copper and an alkaline metal, then converting it into an insoluble compound by heating with a reducing agent, and then separating the valuable material mechanically from the coarser gangue; substantially as described.

In testimony whereof I have hereunto set my hand.

NOAK VICTOR HYBINETTE.

Witnesses:
J. LAWRENCE HAMILTON,
H. E. ROSS.